Patented Aug. 20, 1935

2,012,235

UNITED STATES PATENT OFFICE 2,012,235

PURIFICATION OF 1-N-METHYL-4-HALOGEN-ANTHRAPYRIDONE

Henry J. Weiland, South Milwaukee, and Edwin C. Buxbaum, Shorewood, Wis., assignors to E. I. du Pont de Nemours & Company, Wilmington, Del., a corporation of Delaware No Drawing. Application October 22, 1934, Serial No. 749,478

4 Claims. (Cl. 260—42)

This invention relates to the preparation of 1-N-methyl-4-halogen-anthrapyridones and more particularly to the purification of these compounds to free the same from those impurities which on condensation with arylamines produce blue color bases.

In the preparation of 1-N-methyl-4-bromo-anthrapyridone by the acetylation of 1-methyl-amino-4-bromo-anthraquinone and subsequent ring-closure in alkaline solution, there is usually present in the resulting product certain compounds which on condensation with arylamines and subsequent sulfonation produce blue dyestuffs. The impurity which apparently predominates and which is objectionable in forming blue color bodies on condensation with arylamines is the 1-methylamino-4-bromo-anthraquinone, which remains in the product either due to incomplete acetylation in the original step or due to hydrolysis of the acetylamino-anthraquinone compound on treatment with alkali in the ring-closure of the acetyl body to the anthrapyridone. 1-N-methyl-4-bromo-anthrapyridone, when condensed with an arylamine, such as para-toluidine, and sulfonated, produces a red dyestuff generally known in the trade as Alizarine Rubinol R (Color Index No. 1091). Small amounts only of the blue component, therefore, which results from the condensation of 1-methylamino-4-bromo-anthraquinone with p-toluidine, materially alter the shade of the desired dyestuff. This same difficulty is experienced in preparing the corresponding 1-N-methyl-4-chloro-anthrapyridone. For convenience, however, the invention will be exemplified in connection with the 1-N-methyl-4-bromo-anthrapyridone.

It is an object of this invention to provide a simple and inexpensive method for the preparation of 1-N-methyl-4-halogen-anthrapyridone and to provide a process which will eliminate substantially all of those impurities which on subsequent condensation with an arylamine and sulfonation form blue color compounds.

We have found that when 1-N-methyl-4-bromo-anthrapyridone containing as its greatest impurity 1-methylamino-4-bromo-anthraquinone is dissolved in sulfuric acid and treated with an oxidizing agent at temperatures not materially above 130° C., a purification is effected and the 1-methylamino-4-bromo-anthraquinone is converted to the 1-methylamino-4-hydroxy compound, which under the conditions used in the condensation of the resulting products with arylamines will not form arylamino-anthraquinone bodies. The 1-N-methyl-4-bromo-anthrapyridone is advantageously separated from the sulfuric acid solution by bringing the acid concentration to approximately 78%, as more fully described in copending application Ser. No. 749,479, and as illustrated in the following examples.

The following examples are given to more fully illustrate our invention. The parts used are by weight.

Example 1

50 parts of crude 1-N-methyl-4-bromo-anthrapyridone are dissolved in 300 parts of 93% sulfuric acid at room temperature. The temperature is raised to 90° over a period of one-half hour, and 10 parts of manganese dioxide are slowly added thereto over a period of one hour at this temperature. The mass is then agitated at 90° for two hours and cooled to 60° C. The acid reaction mass is poured into 3000 parts of cold water, filtered, and washed acid free.

Example 2

50 parts of crude 1-N-methyl-4-bromo-anthrapyridone are dissolved in 500 parts of 93% sulfuric acid. The temperature is raised to 75° C. and 5 parts of manganese dioxide are added slowly thereto over a period of one hour. The temperature is then raised to 100° C. and held for two hours. The mass is cooled to 80° C. and 95 parts of water added over a period of one hour maintaining the temperature at 80° C. It is then cooled to room temperature and agitated for eight hours. The product is filtered on wool or a Jena glass filter and sucked dry, and washed with 100 parts of 78% sulfuric acid.

The 1-N-methyl-4-bromo-anthrapyridone is then sludged in 3000 parts of hot water, filtered, washed acid free and dried. The purified 1-N-methyl-4-bromo-anthrapyridone when obtained in this manner is a bright pea green color. Condensation of this product with primary amines, such as p-toluidine, shows complete removal of the principal impurity, namely, 1-methylamino-4-bromo-anthraquinone.

Example 3

100 parts of crude 1-N-methyl-4-bromo-anthrapyridone are dissolved in 1000 parts of 90% sulfuric acid at room temperatures. 10 parts of sodium dichromate are slowly added and the mass is stirred at 30° C. for one hour. The temperature is raised to 110–120° C. and held for two hours. The mass is cooled to 85° C. and 150 parts of water are slowly added while maintaining the temperature at 85–90° C. It is then cooled to 30° and held at 30° for eight hours. The product is filtered, washed with 150 parts of 78% sulfuric acid, sucked dry and sludged in 2000 parts of cold water, filtered and dried. The purified 1-N-methyl-4-bromo-anthrapyridone is a pea green color. The condensation of this product shows complete removal of such impurities of 1-methyl-amino-4-bromo-anthraquinone from the pyridone.

Other oxidizing agents such as alkali-metal permanganates, chromic acid, etc., may be substituted for the manganese dioxide and alkali-metal dichromates used in the above examples. These, however, require somewhat lower temperatures than given in the specific examples. The temperatures used may vary from about 30 to 130° C., the time in which the reaction may be completed also varying with the change in temperature. Sulfuric acid of a concentration of 60 to 100% may be used in this reaction.

In the above examples the 1-N-methyl-4-chloro-anthrapyridone may be substituted for the corresponding bromo-anthrapyridone.

What we claim is:

1. In the preparation of 1-N-methyl-4-halogen-anthrapyridone, the step which comprises subjecting a crude 1-N-methyl-4-halogen-anthrapyridone to the action of a relatively strong inorganic oxidizing agent in sulfuric acid.

2. In the preparation of 1-N-methyl-4-halogen-anthrapyridone, the step which comprises subjecting a crude 1-N-methyl-4-halogen-anthrapyridone to the action of a relatively strong inorganic oxidizing agent in sulfuric acid at temperatures between 30 and 130° C.

3. In the preparation of 1-N-methyl-4-bromo-anthrapyridone, the step which comprises subjecting a crude 1-N-methyl-4-bromo-anthrapyridone to the action of a relatively strong inorganic oxidizing agent in sulfuric acid.

4. In the preparation of 1-N-methyl-4-bromo-anthrapyridone, the step which comprises subjecting a crude 1-N-methyl-4-bromo-anthrapyridone to the action of a relatively strong inorganic oxidizing agent in sulfuric acid at temperatures between 30 and 130° C.

HENRY J. WEILAND.
EDWIN C. BUXBAUM.